United States Patent
Yang et al.

(10) Patent No.: US 10,795,226 B2
(45) Date of Patent: Oct. 6, 2020

(54) DISPLAY DEVICE

(71) Applicant: WUHAN CHINA STAR OPTOELECTRONICS TECHNOLOGY CO., LTD., Wuhan, Hubei (CN)

(72) Inventors: Yong Yang, Hubei (CN); Guowei Zha, Hubei (CN); Xin Zhang, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 16/347,839

(22) PCT Filed: Apr. 16, 2019

(86) PCT No.: PCT/CN2019/082903
§ 371 (c)(1),
(2) Date: May 7, 2019

(87) PCT Pub. No.: WO2020/133811
PCT Pub. Date: Jul. 2, 2020

(65) Prior Publication Data
US 2020/0209661 A1    Jul. 2, 2020

(30) Foreign Application Priority Data

Dec. 29, 2018  (CN) .......................... 2018 1 1640523

(51) Int. Cl.
*G02F 1/1347* (2006.01)
*G02F 1/1335* (2006.01)
(Continued)

(52) U.S. Cl.
CPC .......... *G02F 1/1347* (2013.01); *G02F 1/1334* (2013.01); *G02F 1/1391* (2013.01);
(Continued)

(58) Field of Classification Search
CPC ........... G02F 1/133617; G02F 1/13394; G02F 1/133512; G02F 1/0123; G02F 1/1375;
(Continued)

(56) References Cited

U.S. PATENT DOCUMENTS 6,005,651 A * 12/1999 Takahara .......... G02F 1/133502
349/10
6,061,107 A *  5/2000 Yang ................... G02F 1/13718
349/156

(Continued)

*Primary Examiner* — Shan Liu
(74) *Attorney, Agent, or Firm* — Mark M. Friedman

(57) ABSTRACT

The present invention provides a display device which includes a first substrate, a second substrate, a third substrate, and a fourth substrate. The first substrate and the second substrate are arranged opposite to each other. The third substrate and the fourth substrate are arranged opposite to each other. A liquid crystal layer is located between the first substrate and the second substrate. A bistable polymer dispersed liquid crystal layer is located between the third substrate and the fourth substrate. A band-pass filter is located between the liquid crystal layer and the bistable polymer dispersed liquid crystal layer. A backlight module is located on one side of the fourth substrate away from the third substrate.

8 Claims, 2 Drawing Sheets

(51) Int. Cl.
*G02F 1/1334* (2006.01)
*G02F 1/133* (2006.01)
*G02F 1/139* (2006.01)
*G02F 1/1333* (2006.01)

(52) U.S. Cl.
CPC .... *G02F 1/13306* (2013.01); *G02F 1/133512* (2013.01); *G02F 1/133514* (2013.01); *G02F 2001/133357* (2013.01)

(58) Field of Classification Search
CPC ......... G02F 2001/13347; G02F 1/1347; G02F 1/133514; G02F 1/1368; G02F 1/133536; G02F 1/133528; G02F 2001/13478; G02F 2203/02; G02F 2001/133302; G02F 1/13439; G02F 1/1362; G02F 1/136209; G02F 1/136227; G02F 1/1365; G02F 2001/136218; G02F 2001/136222; G02F 2001/136231; G02F 2001/13625; G02F 2001/1635; G02F 2201/122; G02F 2202/10; G02F 1/0311; G02F 1/116; G02F 1/1335; G02F 1/13362; G02F 1/133533; G02F 2001/133531; G02F 2001/133521; G02F 2001/133556; G02F 2001/133538; G02F 2001/133541; G02F 2001/133543; G02F 2001/133545; G02F 2001/133548; G02F 2001/13355; G02F 2001/133562; G02F 2001/133567; G02F 2201/34; G02F 2201/343; G02F 2201/346; G02F 1/133555; G02F 2001/133557; G09G 2300/0495; G09G 2300/06; G09G 2300/0866; G09G 3/2944; G09G 3/2946; H01S 3/108; H01S 3/1086; H01S 3/30; H04B 10/2537
USPC .............................................. 349/33, 34, 35
See application file for complete search history.

(56) References Cited

U.S. PATENT DOCUMENTS

| | | | |
|---|---|---|---|
| 6,628,355 B1* | 9/2003 | Takahara | G02F 1/1334 348/E9.027 |
| 2002/0109812 A1* | 8/2002 | Takami | G02F 1/13473 349/113 |
| 2002/0171794 A1* | 11/2002 | Nakamura | G02F 1/133555 349/117 |
| 2004/0085660 A1* | 5/2004 | Hara | G02B 5/287 359/883 |
| 2005/0259193 A1* | 11/2005 | Sumiyoshi | G02F 1/133606 349/62 |
| 2008/0013013 A1* | 1/2008 | Kim | G02F 1/133526 349/63 |
| 2012/0120363 A1* | 5/2012 | Ishihara | G02F 1/133711 349/141 |
| 2013/0044276 A1* | 2/2013 | Lee | G02F 1/133615 349/62 |
| 2016/0363811 A1* | 12/2016 | Zhong | G02B 6/0055 |
| 2017/0017114 A1* | 1/2017 | Choi | G02F 1/133512 |
| 2017/0186922 A1* | 6/2017 | Kim | C09K 11/88 |
| 2019/0121193 A1* | 4/2019 | Ono | G02F 1/134363 |
| 2019/0265548 A1* | 8/2019 | Liu | G02F 1/133605 |
| 2019/0331955 A1* | 10/2019 | Lee | G02F 1/13306 |

\* cited by examiner

DISPLAY DEVICE

FIELD OF DISCLOSURE

The present invention relates to a field of display devices and, in particular, to a display device.

DESCRIPTION OF RELATED ART

At present, liquid crystal display (LCD) display technology is widely used in the market. Compared with traditional displays, LCDs have many advantages such as being light and thin, having no radiation, no flickering, and having low power consumption. Transflective display technology has grown into a mature technology in the market. It can display images in both reflective and transmissive modes. It saves power by displaying images in the reflective mode in a high-brightness environment, and can display images through a normal display mode, i.e. the transmissive mode, in a dark environment. However, the transflective display device has a cell thickness that is twice as thick as a thickness of a liquid crystal layer in manufacturing, where transmittance and an aperture ratio in the transmissive mode are also reduced, which is disadvantageous in achieving a high-brightness display function. In addition, such display devices also fails to provide a high-resolution display panel.

SUMMARY

It is an objective of the present invention to provide a display device which overcomes defects existing in conventional technology. The present invention provides a liquid crystal display device with a double cell thickness, utilizing a bistable polymer dispersed liquid crystal (PDLC) layer. According to different environments, the liquid crystal display device works on a reflective mode in a high-brightness environment by adjusting a driving voltage of the display device, and the liquid crystal display device works on a transmissive mode in a dark environment. The present invention provides a transflective display function and also improves transmittance of a display panel.

Accordingly, the present invention provides a solution as follows.

According to the first embodiment of the present invention, a display device is provided, comprising:

a first substrate, a second substrate, a third substrate, and a fourth substrate, the first substrate and the second substrate being disposed opposite to each other, the third substrate and the fourth substrate being disposed opposite to each other;

a liquid crystal layer disposed between the first substrate and the second substrate;

a bistable polymer dispersed liquid crystal layer disposed between the third substrate and the fourth substrate;

a band-pass filter disposed between the liquid crystal layer and the bistable polymer dispersed liquid crystal layer; and a backlight module disposed on one side of the fourth substrate away from the third substrate.

The first substrate is a color filter substrate comprising a built-in polarizer, a first common electrode and a first indium tin oxide pixel electrode are sequentially disposed on the second substrate, the first common electrode and the first indium tin oxide pixel electrode control rotation of a plurality of liquid crystals of the liquid crystal layer for light modulation, and an insulating layer is disposed between the first common electrode and the first indium tin oxide pixel electrode.

A thickness of a liquid crystal cell of the liquid crystal layer satisfies $\Delta nd=\lambda/4$, wherein $\Delta n$ is a reflective index anisotropy of the plurality of liquid crystals, d is the thickness of the liquid crystal cell, $\Delta nd$ is an optical path difference, $\lambda$ is a wavelength of light, and a value of $\lambda$ is 380 nm to 780 nm.

A color filter photoresist film layer is disposed on the first substrate, and a green pixel and a red pixel of the color filter photoresist film layer are made of a quantum dot color filter material, whereby a high color gamut is obtained when blue light is used to excite the color filter photoresist film layer.

The band-pass filter selectively transmits blue light and also reflects red light and green light at a same time.

The third substrate is made of a black matrix and a planarization layer.

A mass fraction of a plurality of liquid crystals in the bistable polymer dispersed liquid crystal layer is 40%-60%, the liquid crystals of the bistable polymer dispersed liquid crystal layer are made of a material the same as a plurality of liquid crystals of the liquid crystal layer, and a thickness of a liquid crystal cell of the bistable polymer dispersed liquid crystal layer satisfies $\Delta nd=\lambda/4$, wherein $\Delta n$ is refractive index anisotropy of the liquid crystals, d is the thickness of the liquid crystal cell, $\Delta nd$ represents an optical path difference, $\lambda$ is a wavelength of light, and a value of $\lambda$ is 380 nm to 780 nm.

The third substrate is a color filter substrate with a second common electrode disposed thereunder, and the fourth substrate is an array substrate on which a second indium tin oxide pixel electrode is disposed, and the second common electrode and the second indium tin oxide pixel electrode control rotation of a plurality of liquid crystals of the bistable polymer dispersed liquid crystal layer to switch the bistable polymer dispersed liquid crystal layer between a high mist scattering state and a transparent state.

The backlight module comprises one of a blue backlight module, an edge-lit backlight module, or a mini light emitting diode (mini-LED) backlight module.

The liquid crystal layer and the bistable polymer dispersed liquid crystal layer are driven by a same integrated circuit (IC) of a same drive circuit, and a maximum value of a driving voltage of the IC is greater than a larger one of threshold voltage values of the two liquid crystal layers.

Advantages of the Present Invention

The present invention provides a display device having two liquid crystal layers. In a high-brightness environment, the display device is driven by a low voltage and works on a reflective display mode. In a dark environment, the display device is driven by a high voltage and works on a transmissive display mode, so that the bistable polymer dispersed liquid crystal layer is in a transparent state. By adjusting a driving voltage of liquid crystals of the bistable polymer dispersed liquid crystal layer, light scattering and transmission are controlled, and thereby screen brightness and darkness are controlled. By using a quantum dot color filter, the present invention provides a high color gamut. Compared to conventional techniques, the transflective display device can provide a transflective display function and also has high transmittance at the same time.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work or paying the premise.

DETAILED DESCRIPTION OF EMBODIMENTS

Figure 1:
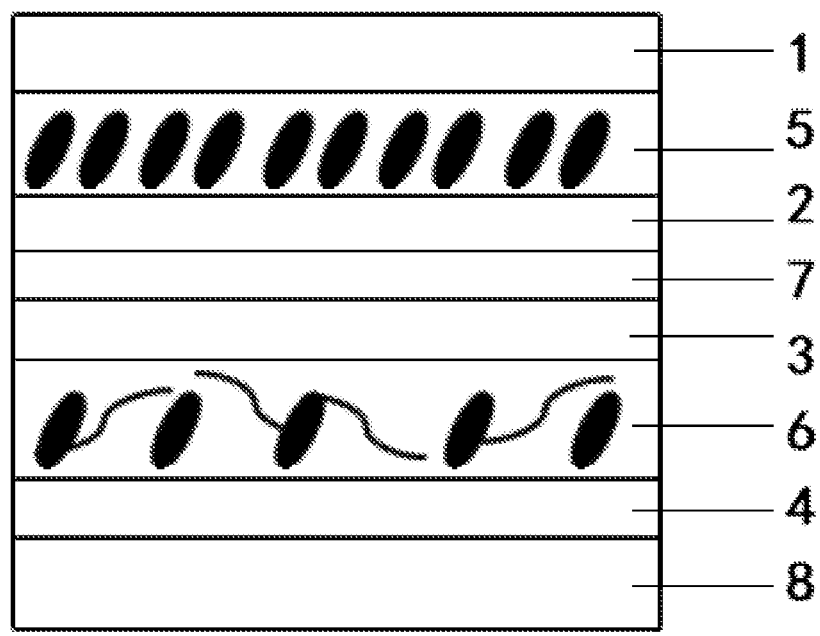
FIG. 1 is a schematic structural view illustrating a display device according to one embodiment of the present invention.

The technical solutions in the embodiments of the present invention will be clearly and completely described in the following with reference to the accompanying drawings. It is apparent that the described embodiments are only a part of the embodiments of the invention, and not all of the embodiments. All other embodiments obtained by a person skilled in the art based on the embodiments of the present invention without creative efforts are within the scope of the present invention.

It should be noted that in the drawings, the dimensions of layers and regions may be exaggerated for clarity of illustration. It should also be understood that when an element or layer is referred to as "on" another element or layer, it may be directly on the other element, or an intermediate layer may be present. In addition, it should be understood that when an element or layer is referred to as "under" another element or layer, it may be directly under the other element, or one or more than one intermediate layer/element may be present. In addition, it should also be understood that when a layer or element is referred to as being "between" two layers or two elements, it can be a single layer between the two layers or elements, or one or more than one intermediate layer or element may be present. The same reference numbers are used throughout the specification to refer to the same or similar parts.

Figure 2:
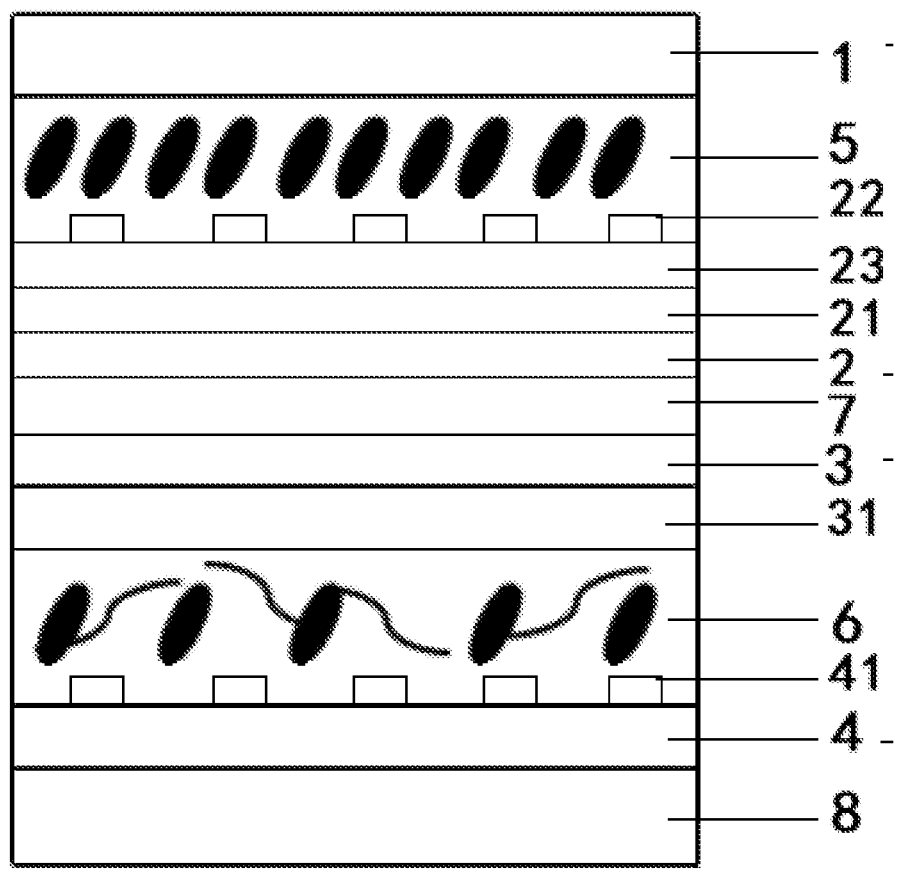
FIG. 2 is a schematic structural view illustrating the display device according to another embodiment of the present invention.

Please refer to FIGS. 1 and 2. According to the first embodiment of the present invention, a display device is provided, comprising:

a first substrate 1, a second substrate 2, a third substrate 3, and a fourth substrate 4, the first substrate 1 and the second substrate 2 disposed opposite to each other, the third substrate 3 and the fourth substrate 4 disposed opposite to each other;

a liquid crystal layer 5 disposed between the first substrate 1 and the second substrate 2;

a bistable polymer dispersed liquid crystal layer 6 disposed between the third substrate 3 and the fourth substrate 4;

a band-pass filter 7 disposed between the liquid crystal layer 5 and the bistable polymer dispersed liquid crystal layer 6; and a backlight module 8 disposed on one side of the fourth substrate 4 away from the third substrate 3.

The first substrate 1 is a color filter substrate comprising a built-in polarizer, a first common electrode 21 and a first indium tin oxide pixel electrode 22 are sequentially disposed on the second substrate 2, the first common electrode 21 and the first indium tin oxide pixel electrode 22 control rotation of a plurality of liquid crystals of the liquid crystal layer 5 for light modulation, and an insulating layer 23 is disposed between the first common electrode 21 and the first indium tin oxide pixel electrode 22.

A thickness of a liquid crystal cell of the liquid crystal layer satisfies $\Delta nd=\lambda/4$, wherein $\Delta n$ is a reflective index anisotropy of the plurality of liquid crystals, d is the thickness of the liquid crystal cell, $\Delta nd$ is an optical path difference, $\lambda$ is a wavelength of light, a value of $\lambda$ is 380 nm to 780 nm, and the value of $\lambda$ is preferably 550 nm.

A color filter photoresist film layer is disposed on the first substrate 1, and a green pixel and a red pixel of the color filter photoresist film layer are made of a quantum dot color filter (abbreviated as QD Color Filter or QDCF) material, whereby a high color gamut is obtained when blue light is used to excite the color filter photoresist film layer.

The bistable polymer dispersed liquid crystal layer 6 selectively transmits blue light and also reflects red light and green light at a same time. The bistable polymer dispersed liquid crystal layer 6 selectively transmits blue light and also reflects red light and green light at a same time, and provides good performance for selectively transmitting blue light and reflecting red light and green light.

The third substrate 3 is made of a black matrix and a planarization layer.

A mass fraction of a plurality of liquid crystals in the bistable polymer dispersed liquid crystal layer 6 is 40%-60%, the liquid crystals of the bistable polymer dispersed liquid crystal layer 6 are made of a material the same as a the liquid crystals of the liquid crystal layer 5, and a thickness of a liquid crystal cell of the bistable polymer dispersed liquid crystal layer 6 satisfies $\Delta nd=\lambda/4$, wherein $\Delta n$ is refractive index anisotropy of the liquid crystals, d is the thickness of the liquid crystal cell, $\Delta nd$ represents an optical path difference, $\lambda$ is a wavelength of light, a value of $\lambda$ is 380 nm to 780 nm, and the value of $\lambda$ is preferably 550 nm.

The third substrate 3 is a color filter substrate with a second common electrode 31 disposed thereunder, and the fourth substrate 4 is an array substrate on which a second indium tin oxide pixel electrode 41 is disposed, and the second common electrode 31 and the second indium tin oxide pixel electrode 41 control rotation of the liquid crystals of the bistable polymer dispersed liquid crystal layer 6 to switch the bistable polymer dispersed liquid crystal layer 6 between a high mist scattering state and a transparent state.

The backlight module 8 comprises one of a blue backlight module, an edge-lit backlight module, or a mini light emitting diode (mini-LED) backlight module.

Figure 3:
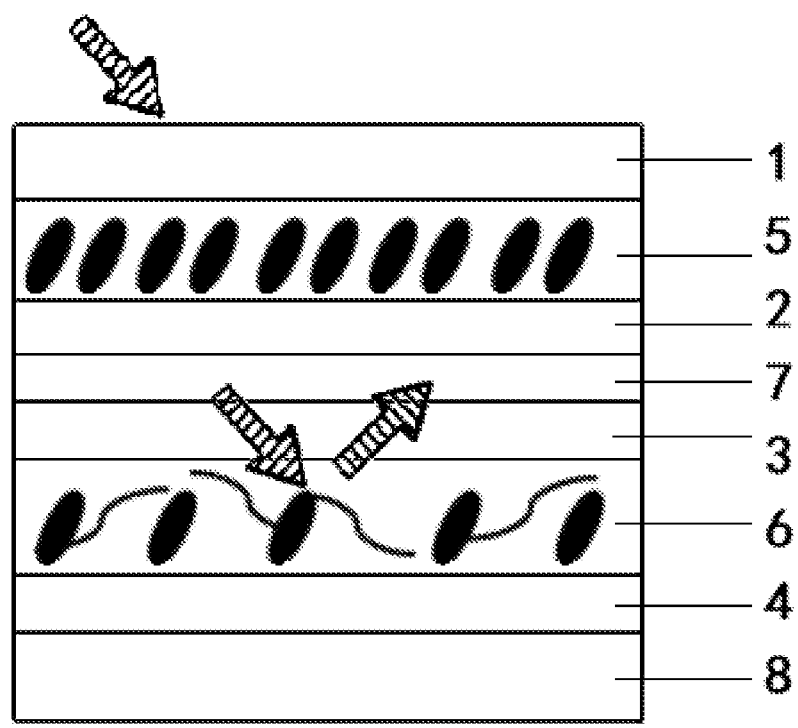
FIG. 3 is a schematic view illustrating that the display device is driven according to one embodiment of the present invention.

The display device works on display modes as follows:

Referring to FIG. 3, in a high-brightness environment, driven with a low voltage, the liquid crystals of the liquid crystal layer 5 are rotated at the low driving voltage for light modulation, and the display mode is a fringe field switching (FFS) mode, and the liquid crystals of the bistable polymer dispersed liquid crystal layer 6 cannot be rotated because they require a high driving voltage. At this point, the bistable polymer dispersed liquid crystal layer 6 is in a high mist scattering state, and when ambient light passes through the band-pass filter, red and green light is reflected (as indicated by arrows in the drawing), whereby a reflective display mode is realized. Light is scattered when passing through the bistable polymer dispersed liquid crystal layer 6, and a backlight 8 is turned off at this time, thereby achieving power saving.

Figure 4:
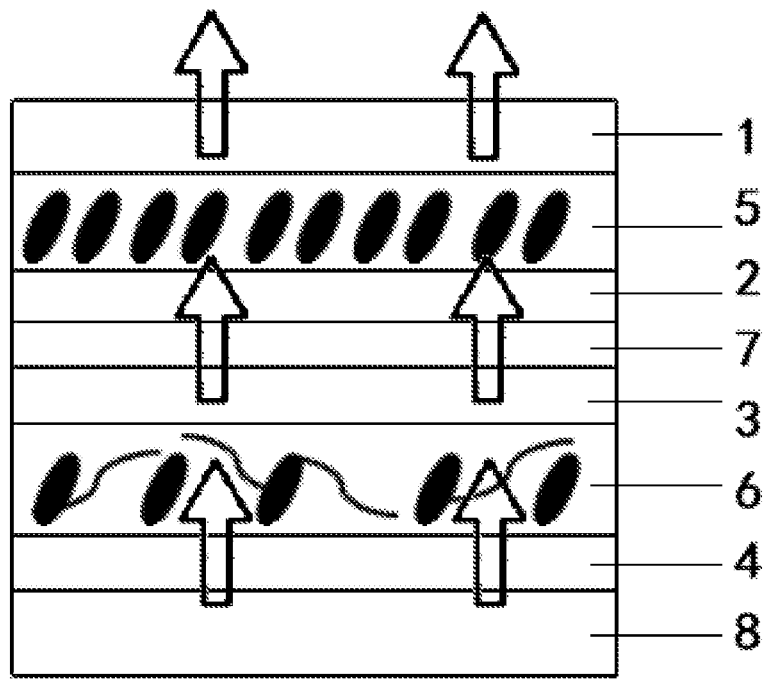
FIG. 4 is a schematic view illustrating that the display device is driven according to another embodiment of the present invention.

Referring to FIG. 4, in a dark environment, the driving voltage is increased, the liquid crystals of the liquid crystal layer are rotated for light modulation, and the liquid crystals of the bistable polymer dispersed liquid crystal layer 6 can also be rotated for light modulation at a high driving voltage. At this point, the bistable polymer dispersed liquid crystal layer 6 is in a transparent state, and the two liquid crystal layers have a cell thickness substantially equivalent to a thickness of a transmissive liquid crystal cell, so the display device has high transmittance. At this time, the backlight module 8 is turned on, and when blue light passes through the two liquid crystal layers, the blue light excites the quantum dot color filter material to provide a high color gamut (as indicated by arrows in the drawing), and thereby the display device works on a transmissive mode. By adjusting the driving voltage of the liquid crystals in the bistable polymer dispersed liquid crystal layer 6, the liquid crystals can be switched between the high mist scattering state and the transparent state for controlling brightness and darkness of a screen.

It should be noted that the liquid crystal layer 5 and the bistable polymer dispersed liquid crystal layer 6 are driven by a same integrated circuit (IC) of a same driving circuit, and a maximum driving voltage of the IC is greater than a larger one of threshold voltage values of the two liquid crystal layers, so the driving voltage can be controlled. Since the driving voltage of the liquid crystals in the bistable polymer dispersed liquid crystal layer 6 needs to be 20 V or more, and the driving voltage of the liquid crystals in the liquid crystal layer 5 only needs to be about 5 V. Therefore, when the driving voltage output from the IC is controlled to be only 5V, only the liquid crystals of the liquid crystal layer 5 are driven to realize the reflective mode. When the output voltage is 20V, two liquid crystal cells, i.e. the liquid crystal layer 5 and the bistable polymer dispersed liquid crystal layer 6, are driven together for realizing the transmissive mode.

The present invention provides a display device having two liquid crystal layers. In a high-brightness environment, a driving voltage is low to realize a reflective mode, and in a dark environment, a driving voltage is high to switch a bistable polymer dispersed liquid layer to a transparent state to realize a transmissive mode. By adjusting the driving voltage of the liquid crystals in the bistable polymer dispersed liquid crystal layer, light scattering and transmission are controlled, thereby brightness and darkness variations are controlled, and a high color gamut is obtained using the bistable polymer dispersed liquid crystal layer. Compared with conventional transflective display devices, the display device of the present invention provides a transflective display function, and also has high transmittance and overcomes a problem of low transmittance of a conventional transflective display device.

The display device of the present invention can be used in various occasions, and can be combined with various devices and structures to form a display panel or other devices with a display function, such as a tablet computer, a television, and a display window. It should be understood that in order to provide functionality, the display device of the present invention includes components, structures, and so on which are not shown in this specification.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A display device, comprising:
a first substrate, a second substrate, a third substrate, and a fourth substrate, the first substrate and the second substrate disposed opposite to each other, the third substrate and the fourth substrate disposed opposite to each other;
a liquid crystal layer disposed between the first substrate and the second substrate;
a bistable polymer dispersed liquid crystal layer disposed between the third substrate and the fourth substrate;
a band-pass filter disposed between the liquid crystal layer and the bistable polymer dispersed liquid crystal layer; and
a backlight module disposed on one side of the fourth substrate away from the third substrate,
wherein a mass fraction of a plurality of liquid crystals in the bistable polymer dispersed liquid crystal layer is 40%-60%, the liquid crystals of the bistable polymer dispersed liquid crystal layer are made of a material the same as a plurality of liquid crystals of the liquid crystal layer, and a thickness of a liquid crystal cell of the bistable polymer dispersed liquid crystal layer satisfies $\Delta n * d = \lambda/4$, wherein $\Delta n$ is the refractive index anisotropy of the liquid crystals of the bistable polymer dispersed liquid crystal layer, d is the thickness of the liquid crystal cell, $\Delta n * d$ represents an optical path difference, $\lambda$ is a wavelength of light, and a value of $\lambda$ is between 380 nm to 780 nm.

2. The display device according to claim 1, wherein the first substrate is a color filter substrate comprising a built-in polarizer, a first common electrode and a first indium tin oxide pixel electrode sequentially disposed on the second substrate; the first common electrode and the first indium tin oxide pixel electrode control rotation of a plurality of liquid crystals of the liquid crystal layer for light modulation, and an insulating layer is disposed between the first common electrode and the first indium tin oxide pixel electrode.

3. The display device according to claim 1, wherein a color filter photoresist film layer is disposed on the first substrate, and a green pixel and a red pixel of the color filter photoresist film layer are made of a quantum dot color filter material, whereby a high color gamut is obtained when blue light is used to excite the color filter photoresist film layer.

4. The display device according to claim 1, wherein the band-pass filter selectively transmits blue light and also reflects red light and green light at a same time.

5. The display device according to claim 1, wherein the third substrate is made of a black matrix and a planarization layer.

6. The display device according to claim 1, wherein the third substrate is a color filter substrate with a second common electrode disposed thereunder, and the fourth substrate is an array substrate on which a second indium tin oxide pixel electrode is disposed, and the second common electrode and the second indium tin oxide pixel electrode control rotation of a plurality of liquid crystals of the bistable polymer dispersed liquid crystal layer to switch the bistable polymer dispersed liquid crystal layer between a high mist scattering state and a transparent state.

7. The display device according to claim 1, wherein the backlight module comprises one of a blue backlight module, an edge-lit backlight module, or a mini light emitting diode backlight module.

8. The display device according to claim 1, wherein the liquid crystal layer and the bistable polymer dispersed liquid crystal layer are driven by a same integrated circuit (IC) of a same drive circuit, and a maximum value of a driving voltage of the IC is greater than a larger one of threshold voltage values of the two liquid crystal layers.

\* \* \* \* \*